United States Patent
Sukhanov et al.

(10) Patent No.: US 6,727,937 B1
(45) Date of Patent: Apr. 27, 2004

(54) HOLOGRAPHIC DEVICE FOR FORMATION OF COLORED, POLARIZED AND ANGULARLY SEPARATED LIGHT BEAMS AND VIDEO IMAGE PROJECTOR WHICH UTILIZES IT

(75) Inventors: Vitaly I. Sukhanov, St. Petersburg (RU); Alexander Galpern, St. Petersburg (RU); Brahim Dahmani Dahmani, Montrouge (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/403,233
(22) PCT Filed: Apr. 6, 1998
(86) PCT No.: PCT/US98/06794
§ 371 (c)(1), (2), (4) Date: Jan. 18, 2000
(87) PCT Pub. No.: WO98/47028
PCT Pub. Date: Oct. 22, 1998

(30) Foreign Application Priority Data

Apr. 15, 1997 (FR) .............................................. 97 04620

(51) Int. Cl.$^7$ .............................................. H04N 13/00
(52) U.S. Cl. .............................................. 348/40; 359/1
(58) Field of Search .............................. 348/57, 58, 40, 348/41; 359/12, 14, 15, 19, 1, 22, 35; 356/457, 487

(56) References Cited

U.S. PATENT DOCUMENTS

| 5,404,234 A | * | 4/1995 | Taniguchi et al. | ............. 359/15 |
| 5,784,181 A | * | 7/1998 | Loiseaux et al. | ............... 359/1 |
| 6,560,018 B1 | * | 5/2003 | Swanson | .................... 359/569 |
| 6,633,419 B2 | * | 10/2003 | Hosono et al. | ................ 359/35 |

* cited by examiner

Primary Examiner—Chris Kelly
Assistant Examiner—Behrooz Senfi
(74) Attorney, Agent, or Firm—Philip G. Alden

(57) ABSTRACT

A holographic device, which has first and second roughly coplanar and superposed holograms, which are illuminated by the same non-polarized light beam with at least first and second spectral compositions, the holograms each being recorded in a manner such that in its middle, the axis of the diffracted beam is perpendicular to the direction of the incident beam in this medium, the diffracted beams forming first and second angularly separated light beam with the same polarization, and having different spectral compositions.

20 Claims, 1 Drawing Sheet

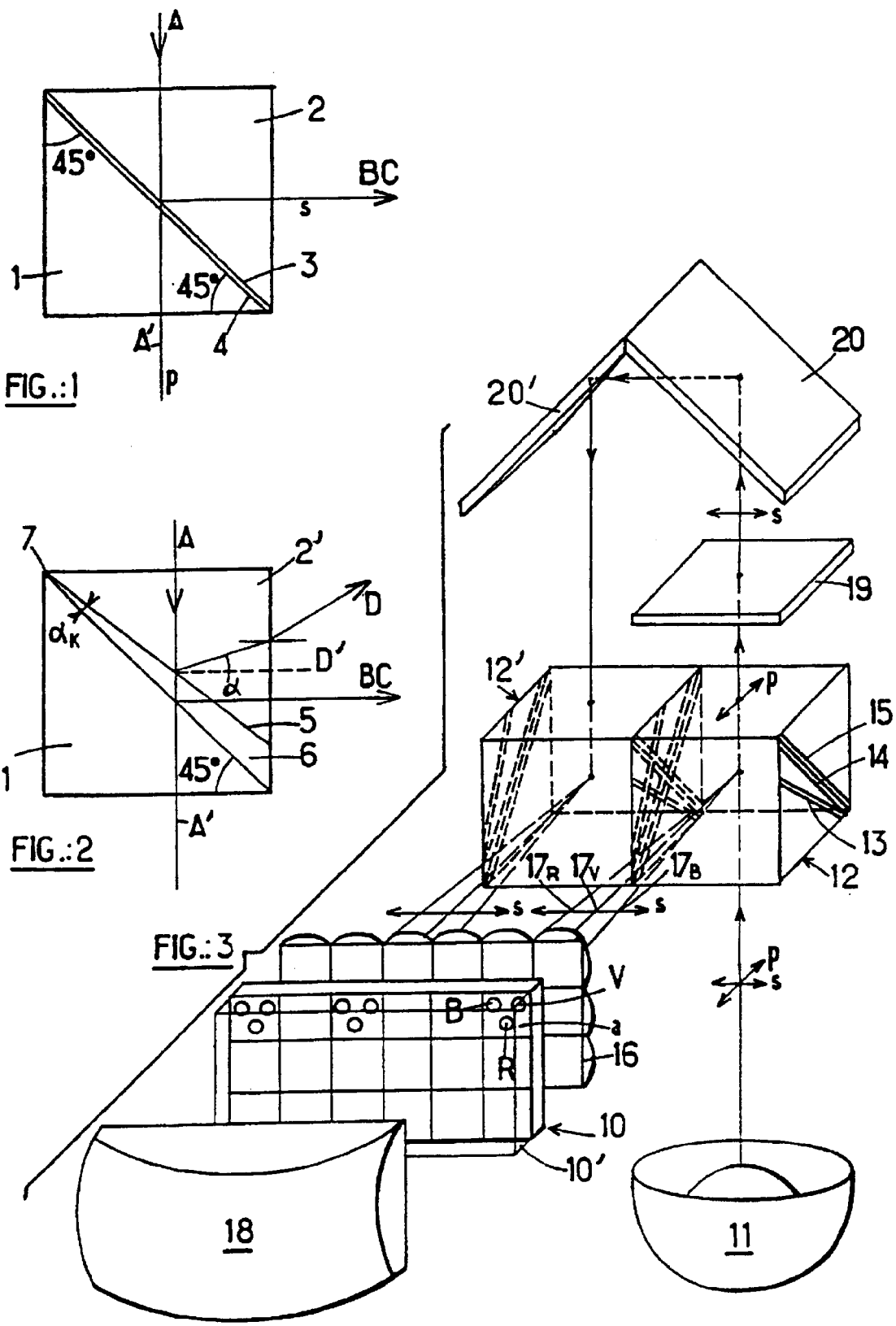

HOLOGRAPHIC DEVICE FOR FORMATION OF COLORED, POLARIZED AND ANGULARLY SEPARATED LIGHT BEAMS AND VIDEO IMAGE PROJECTOR WHICH UTILIZES IT

The present invention relates to a holographic device for formation of at least first and second colored, angularly separated light beams, and more particularly, to a device for formation of such beams with the same planar polarization and having first and second predetermined spectral compositions respectively. Still more particularly, the invention relates to a video image projector incorporating such a device.

A device is known from the patent U.S. Pat. No. 5,161,042, which is based on the use of dichroic mirrors for angularly separating three light beams of different colors illuminating a matrix screen of liquid crystal cells through a grid of micro-lenses, for the projection of a video image displayed on this screen. The three beams are separated angularly in the same plane and are therefore suitable if the three liquid crystal cells which define a pixel of the image registered on the screen are aligned. They are not suitable if they are arranged at the apexes of a triangle, according to the configuration called "Δ", for example. Furthermore, the three beams obtained are not polarized linearly, and it is therefore not possible to do without the two crossed polarizers which ordinarily equip a liquid crystal matrix screen and which have the disadvantage of absorbing a substantial quantity of the luminous energy.

Also known from the international patent application WO-A-92/09915 is a holographic device for illumination of such a screen by suitably colored and polarized light beams, formed by three distinct sets of prisms and holograms, which make the device bulky. The present invention aims to produce a holographic device for formation of colored and polarized light beams which are angularly separated, for the projection of a video image displayed on a matrix screen of liquid crystal cells, whose space requirement is as small as possible.

The present invention also aims to produce such a device making it possible to angularly separate three such beams according to three non-coplanar directions, for the illumination of a liquid crystal screen in which the three cells defining a pixel of the image are not arranged in a line.

The present invention furthermore aims to produce such a device which has a high luminous yield and good compactness.

These aims of the invention are achieved, as are others which will appear upon reading of the following description, with a holographic device for formation of at least first and second angularly separated light beams, with the same planar polarization, and having first and second predetermined spectral compositions respectively, this device being remarkable in that it has first and second roughly coplanar and superposed holograms, which are illuminated by the same nonpolarized light beam with at least said first and second spectral compositions, said holograms each being recorded in a manner such that in its middle, the axis of the diffracted beam is perpendicular to the direction of the incident beam, said diffracted beams forming said first and second angularly separated light beams with the same polarization, and having first and second predetermined spectral compositions respectively.

As will be seen in detail subsequently, the light beams thus formed are produced by the same optical assembly, with a reduced space requirement.

According to one embodiment of the invention, the holograms are squeezed between two attached adjacent prisms, made of optical material. They are recorded in a material with a refractive index roughly equal to that of the material constituting said prisms. They are illuminated by a beam of light with a 45° incidence, the axes of the beams diffracted by these holograms converging on the axis of the incident beam hitting the holograms and being in a plane perpendicular to this axis.

According to a first variant, the device includes a third hologram roughly coplanar with the other two, recorded so as to form a diffracted beam of light with planar polarization with a third predetermined spectral composition, whose axis is coplanar and converging with those of the other two diffracted beams. As will be seen subsequently, such a device is suitable for illuminating matrix screens of liquid crystal cells in which the cells of the triplets, each of which defines a pixel of the displayed image, are aligned.

According to another variant of the device according to the invention, a third hologram is included which is not coplanar with the other two, recorded in a material with a different index from the index of the other two, and arranged to form a third diffracted beam whose axis is not coplanar with the axes of the beams diffracted by the first and second holograms, said third beam being polarized linearly like the other two and having a third predetermined spectral composition. In this variant, the device includes a third cuneiform prism inserted between the other two prisms, the first and second holograms being squeezed between a face of this third prism and a face of one of the other prisms, while the third hologram is squeezed between another face of this third prism and a face of the other of the other prisms, the planes of the holograms converging on an edge common to the three prisms. As will be seen subsequently, this variant is suitable for the illumination of a matrix screen of liquid crystal cells in which the cells of the triplets of cells, each of which defined a pixel of the image to be displayed, are not aligned and are arranged, for example, in Δ configuration Other characteristics and advantages of the device according to the present invention will appear upon reading of the following description and upon examination of the appended drawing in which:

FIGS. 1 and 2 diagrammatically represent the first and second variants of the device according to the invention mentioned above, respectively, and FIG. 3 is a diagram of the video image projector incorporating the device of FIG. 2.

Reference is made to FIG. 1 of the appended drawing in which the device represented includes two identical rectangular prisms 1, 2, isosceles in cross section perpendicular to a hypotenuse face, produced from a transparent optical material such as glass. These two prisms are attached according to their hypotenuse faces by squeezing between them at least first and second holograms 3 and 4 respectively, which are recorded in at least one light-sensitive medium.

According to the invention, one of the two holograms, hologram 3, for example, can be recorded in the medium by the interaction of two light beams with a predetermined spectral composition, in a manner such that these two beams interact in the material of the recording support, according to wave vectors oriented at 90° with respect to one another, in the plane of FIG. 1, for example. It is known that, upon reading of a hologram thus recorded, if the hologram is illuminated with a beam with said spectral composition, the wave vector of the diffracted beam is also oriented at 90° with respect to the incident beam.

It is also known that the diffraction yield for the radiation component polarized in the plane of incidence (component p) is then zero while this yield for the component polarized perpendicularly to the plane of incidence (component s) is 100%. For more details on this characteristic, it will be possible to consult the article of Kogelnik entitled "Waves in thick holograms", published in The Bell Systems Technical Journal, 1969, pages 2909 to 2917.

The process of recording described above, although theoretically usable for obtaining the holograms to be installed in the device according to the present invention, is not that which is preferred in practice. For reasons connected with the spectral sensitivities of the currently available hologram recording materials, it is preferable to use a monochromatic radiation source suited to the sensitivity of this recording material. In this case, the angle of the beams which interfere with the recording to create the spatially modulated distribution of the refractive index which constitutes the hologram is not necessarily 90° and can be calculated conventionally so that upon reading, one finds an angle of 90° in the hologram between the incident beam and the diffracted beam.

When hologram 3, obtained by either of the recording processes described above, is illuminated with a light beam with axis A, oriented at 45° from the normal to the hologram, having the predetermined spectral composition mentioned above, axis B of the diffracted beam is oriented in the plane of FIG. 1, perpendicular to axis A of the incident beam if, of course, the material in which the hologram has been recorded has an identical refractive index or a refractive index which is at least very close in practice to the refractive index of the glass of prism 2. As an example of such a material, it is possible to mention the light-sensitive polymer marketed by the company Dupont de Nemours under the reference HRF-100, which has a refractive index of 1.51.

Furthermore, in accordance with the instructions of the aforementioned Kogelnik article, beam B is entirely polarized linearly, since the yield of diffraction of component s of the light of beam A can be close to 100%, while component p of this beam is absent from diffracted beam B and is found in the zero order beam with axis A' colinear with axis A.

This characteristic is very advantageous in that in the application to the projection of video images displayed on a matrix screen of liquid crystal cells, it makes it possible to rid this screen of the polarizing film with which such a screen is ordinarily equipped, and which absorbs a large fraction of the light passing through it. The brightness of the projected images is thus considerably improved with a projector such as that represented in FIG. 3, which will be described in detail subsequently.

Thus, the invention makes it possible to form a beam of light B which is entirely polarized linearly and with a predetermined spectral composition, and with a wave vector in the plane of FIG. 1, suitable for being used directly for the illumination of a matrix screen of liquid crystal cells attached to a grid of micro-lenses for focusing of the light of this beam on the cells of the screen, these cells controlling the transmission of beams of light with said spectral composition towards a projection surface.

In practice, however, the projection of video images in color requires the use of at least two such light beams, and preferably three, for example, beams of red, green and blue light focused by the grid of micro-lenses on the corresponding liquid crystal cells of triplets of such cells each associated with a pixel of the image to be projected. These cells control the transmission of beams of red, green and blue light towards the projection surface in order to cause an image to appear there, an image which is generally enlarged, as will be seen further on in connection with FIG. 3.

For this purpose, between the two prisms 1 and 2, besides hologram 3, hologram 4 and a third hologram (not represented in FIG. 1) are arranged, these three holograms being recorded, for example, in the same recording material, by one of the processes described above.

Upon reading of these three holograms, the wave vectors of the diffracted beams must be oriented differently in a plane perpendicular to the plane of FIG. 1 and passing through axis B of the beam diffracted by hologram 3. For this purpose, the beams which interfere with the recording of hologram 4, for example, can be such that the wave vector of one of the beams is oriented according to direction A and the wave vector of the other is inclined with respect to the plane of the figure and is in a plane perpendicular to this figure and passing through the axis of beam B. Thus an angle of 90° is maintained between the beams which interact in the material of the hologram.

When the device of FIG. 1 is illuminated according to axis A with a single nonpolarized light, covering the two spectral compositions used for the recording of holograms 3 and 4, they respectively diffract beam B as described above and beam C with the same planar polarization but with a different spectral composition from that of beam B, according to two directions inclined with respect to one another. Thus, the axis of beam C is inclined with respect to the plane of the figure while being the same in projection in the plane with the axis of beam B.

It can be seen that by arranging a third hologram between prisms 1 and 2 and by recording it using two light beams with a third spectral composition in a manner such that the wave vector of one of the beams is oriented according to A and the wave vector of the other is inclined with respect to the axes of beams B and C in the plane perpendicular to FIG. 1 and passing through axes B and C, by diffraction of a single light beam with the three spectral compositions used to record the holograms, three diffracted beams with the same planar polarization but with three different colors are formed, whose axes are coplanar and separated angularly from one another. One of them is in the plane of FIG. 1 and the other two are, for example, arranged symmetrically with respect to this plane. In the application more particularly intended by the present invention to the projection of video images displayed on a matrix screen of liquid crystal cells, a grid of micro-lenses takes the three beams and focuses corresponding beams of light on cells of the screen associated with the red, green and blue components, respectively, of the image to be projected.

The device described above has the advantage of a minimal space requirement, that of a single cube of glass constituted by the assemblage of prisms 1 and 2. However, it does not make it possible to illuminate a screen constituted by triplets of cells for red, green and blue colors respectively, when the cells of the triplet are not arranged in a line, for example, in Δ configuration. FIG. 2 of the appended drawing diagrams a second variant of the device according to the invention allowing this result to be attained.

In this figure, it is shown that the device, like the device of FIG. 1, includes rectangular prism 1 supporting, on its hypotenuse face, holograms 3 and 4 recorded in the same medium, for example, which play the same part as those of the device of FIG. 1. A medium containing a third hologram 5 is placed between rectangular prism 2' and cuneiform prism 6 of which one face is adjacent to holograms 3 and 4 and of which another face is adjacent to hologram 5. The planes of holograms 3 and 4, on one hand, and 5, on the other hand, converge on edge 7 common to the tree prisms 1, 2' and 6. The angle at the summit $a_k$ of the cuneiform prism 6, measured on this edge 7, has a value of which the determination will be explained subsequently. The cuneiform prism 6 and prism 2' together have a volume identical to that of prism 2 of the device of FIG. 1. Thus the devices of FIGS. 1 and 2 both have the compact form of a cube.

According to one characteristic of the device of FIG. 2, the medium containing hologram 5 has a different refractive index from that of holograms 3 and 4. For this purpose, it will be possible to use, for holograms 3 and 4, the aforementioned light-sensitive polymer of Dupont, and for the recording of hologram 5, a layer of bichromated gelatin with index $n_5=1.38$. The value of this arrangement is explained below.

Hologram 5 is recorded by bringing about the interaction of two beams of radiation with a predetermined spectral composition, different from that used for holograms 3 and 4. Furthermore, the beams used for the recording of hologram 5 must interact at 90° with respect to one another in order to ensure the complete polarization of the diffracted beam. If one were to use, for hologram 5, during its recording with a reference beam with orientation A, a material with an index equal to that of the material used for the recording of holograms 3 and 4, identical to that of prism 2', this condition of interaction would result in the formation of a diffracted beam with orientation D' perpendicular to the direction A and therefore parallel to the plane containing the axes of beams B and C. Now, it is necessary for the illumination of the triplets of cells arranged at the summits of a triangle in Δ configuration, for the axis D of the beam diffracted by hologram 5 to be inclined with respect to the plane containing the axes of the beams B and C, so that the same micro-lens can focus three beams of light which are taken from these three beams and which are crossed over its opening, on the three cells in Δ configuration of the same triplet of cells.

Then, in order to regain, with the device of FIG. 2, the condition of the orthogonal nature of the directions of propagation in the medium of hologram 5 of the incident and diffracted beams necessary for obtaining a high level of polarization of the diffracted beam and the angle of inclination $a=2a_k$, in prism 2', of this beam with respect to the plane containing the axes of beams B and C, it is demonstrated that the angle at the summit $a_k$ of cuneiform prism 6 must be connected with the refractive indexes of the materials of the holograms by the equation:

$$|a_k| = \left|\arcsin\left(\frac{n_5}{n} \cdot \sin 45°\right) - 45°\right|$$

in which $n_5$, n are the refractive indexes of the material of hologram 5, and of the material of holograms 3 and 4, respectively.

It is seen that the device of FIG. 2, in which the axes of beams B, C and D form the edges of a triangular pyramid, makes it possible to illuminate, through a grid of micro-lenses for focusing which is known in itself, all the liquid crystal cells of the matrix screen, in which the three cells which define a pixel of the image are arranged in Δ configuration. This result is reached with a compact device, making it possible to eliminate the polarizing film normally associated with such a screen, and therefore the losses of luminous energy due to the absorption of light in this film, in accordance with all the aims of the present invention.

The luminance of the image projected by a video projector equipped with the device according to the invention is advantageously increased by the elimination of the polarizing film. Such a projector is described in connection with the examination of FIG. 3 which diagrams, in the form of a perspective view, the optical system of a projector of video images displayed on screen 10 of liquid crystal cells. The system includes polychromatic light source 11, for example, a source of natural white light which can be broken down conventionally into two components p and s with planar polarization, which are perpendicular to one another. The optical system also includes device 12 such as that represented in FIG. 2, provided with holograms 13, 14, 15 recorded and arranged in the manner of holograms 3, 4 and 5 of the device of FIG. 2, respectively. The light from source 11, diffracted by holograms 13, 14, and 15, illuminates screen 10 through a grid of micro-lenses 16. Each of the lenses of this grid then focuses three beams of light $17_R$, $17_V$, $17_B$, red, green, and blue, respectively, for example, on three liquid crystal cells R, V, and B, respectively, of the screen, defining together a pixel of the image displayed on screen 10, as represented for surface element $10a$ of screen 10.

These three light beams being entirely polarized linearly on coming out of device 12, screen 10 is free of the polarizing film with which it is conventionally equipped, which therefore reinforces the intensity of the light which illuminates cells R, V, B as was seen above. These cells, associated with analyzer 10', conventionally act as light valves, controlled in all-or-nothing [mode] by an electronic [device] which is known in itself, an objective 18 taking the light transmitted by screen 10 in order to project it on a projection surface (not represented) in which an enlarged image of that displayed on screen 10 appears.

In FIG. 3, device 12 only illuminates half of screen 10, the other half being illuminated by identical device 12' attached to device 12 and pivoted, around a horizontal axis, one quarter of a turn with respect to the latter. Device 12' receives, coming in, the zero order beam which passes through holograms 13, 14, and 15 of device 12, parallel to the axis of the light beam coming from source 11. This zero order beam is mainly made up of component p of the light emitted by this source, since the majority of component s goes in the beams diffracted by holograms 13, 14, and 15 as seen above. For device 12' to receive mainly component s, the only one diffracted in this device, half wave plate 19 is arranged coming out of device 12. A beam mainly containing component p, by passing through this plate, is transformed into a beam mainly containing component s, directed towards two return mirrors 20, 20' which shift this beam towards device 12'.

One sees that due to the use of the two devices 12, 12', the light flow from source 11 is completely used, including the energy contained in the zero order beam of holograms 13, 14, 15. This is not possible with a device for illumination of a matrix screen of liquid crystal cells equipped with a conventional polarizer, which entirely absorbs one of the components with planar polarization of the incident beam, and which causes losses in the other usable component.

It is clear that if the triplets of cells R, V, B of screen 10 were aligned, devices of the type of FIG. 1 rather than of the type of FIG. 3 would be installed in the optical system of FIG. 3.

It now appears that the invention indeed makes it possible to attain the stated aims, namely to produce a projector of video images with a compact optical system and with a high luminous yield, which can be adapted to matrix screens of liquid crystal cells with triplets which are aligned or in Δ configuration.

What is claimed is:

1. A holographic device for formation of at least first and second angularly separated light beams, with the same planar polarization, and having first and second predetermined spectral compositions, respectively, said device comprising first and second roughly coplanar and superposed holograms, which are illuminated by the same nonpolarized incident light beam with at least said first and second spectral compositions, said holograms each being recorded in a medium in a manner such that in its middle, each hologram produces a diffracted beam the axis of which is perpendicular to the direction of said nonpolarized incident beam in the medium, said diffracted beams forming said first and second angularly separated light beams with the same polarization, and having the first and second predetermined spectral compositions, respectively.

2. Device according to claim 1, wherein said holograms are placed between two attached adjacent prisms made of optical material.

3. Device according to claim 2, wherein said holograms are recorded in a material with a refractive index (n) roughly equal to that of the material constituting said prisms.

4. Device according to claim 3, wherein said holograms are illuminated at a 45° incidence, and the axes of the beams diffracted by the holograms converge on the axis of said nonpolarized incident light beam and are in a plane perpendicular to that axis.

5. Device according to claim 1, wherein the device comprises a third hologram roughly coplanar with the other two, recorded so as to form a diffracted beam of light with planar polarization with a third predetermined spectral composition, whose axis is coplanar and converging with those of the other two diffracted beams.

6. Device according to claim 1, wherein (a) the first and second holograms are recorded in a material having an index of refraction (n) and (b) the device comprises a third hologram which is not coplanar with the other two holograms, is recorded in a material with a different index from the index of the other two, and is arranged in order to form a third diffracted beam whose axis is not coplanar with the axes of the beams diffracted by first and second holograms and perpendicular, in the medium of said third hologram, to the axis of said nonpolarized incident light beam, said third beam being polarized linearly like the other two and having a third predetermined spectral composition.

7. Device according to claim 6, wherein the device comprises a third cuneiform prism inserted between two other prisms, said first and second holograms being squeezed between a face of the third prism and a face of one of the other prisms, and the third hologram being squeezed between another face of the third prism and a face of the other of the other two prisms, the planes of the holograms converging on an edge common to the three prisms.

8. Device according to claim 7, wherein the angle ($\alpha$) of inclination of the third diffracted beam with respect to the plane of the axes of the other two diffracted beams is connected with the angle at the apex $\alpha_k$ of the cuneiform prism on the edge common to the three prisms and with the refractive indexes of the materials of the holograms by the equation:

$$|\alpha|[|\alpha_k|] = |2\alpha_k| = 2\left|\arcsin\left(\frac{n_5}{n} \cdot \sin 45°\right) - 45°\right|$$

in which n is the refractive index of the material of the first and second holograms, and $n_5$ the refractive index of the material of the third hologram.

9. A projector of video images comprising:
(a) a first assembly which comprises a matrix screen of liquid crystal cells attached to a grid of optical micro-lenses arranged for focusing at least two beams of polarized light with predetermined spectral compositions on at least two corresponding cells of the screen, and
(b) a second assembly which comprises at least one holographic device according to claim 1 for illuminating the micro-lenses of the grid with at least two beams of light with said spectral compositions.

10. Projector according to claim 9, wherein the second assembly comprises first and second holographic devices, each of which illuminates a particular zone of the grid of micro-lenses, one of said holographic devices being illuminated directly by a light source and the other of said holographic devices collecting the zero order beam from the holograms of the first holographic device.

11. Projector according to claim 10, wherein the second assembly comprises a half wave plate and a pair of mirrors arranged on the zero order beam of the first holographic device, in order to rotate the plane of polarization of said zero order beam and to shift its axis in the direction of that of the second holographic device.

12. A projector of video images comprising:
(a) a first assembly which comprises a matrix screen of liquid crystal cells attached to a grid of optical micro-lenses arranged for focusing at least two beams of polarized light with predetermined spectral compositions on at least two corresponding cells of the screen, and
(b) a second assembly which comprises at least one holographic device according to claim 5 for illuminating the micro-lenses of the grid with at least two beams of light with said spectral compositions.

13. Projector according to claim 12, wherein the second assembly comprises first and second holographic devices, each of which illuminates a particular zone of the grid of micro-lenses, one of said holographic devices being illuminated directly by a light source and the other of said holographic devices collecting the zero order beam from the holograms of the first holographic device.

14. Projector according to claim 13, wherein the second assembly comprises a half wave plate and a pair of mirrors arranged on the zero order beam of the first holographic device, in order to rotate the plane of polarization of said zero order beam and to shift its axis in the direction of that of the second holographic device.

15. A projector of video images comprising:
(a) a first assembly comprising a matrix screen of liquid crystal cells attached to a grid of optical micro-lenses arranged for focusing at least two beams of polarized light with predetermined spectral compositions on at least two corresponding cells of the screen, and
(b) a second assembly comprising at least one holographic device according to claim 6 for illuminating the micro-lenses of the grid with at least two beams of light with said spectral compositions.

16. Projector according to claim 15, wherein the second assembly comprises first and second holographic devices, each of which illuminates a particular zone of the grid of micro-lenses, one of said holographic devices being illuminated directly by a light source and the other of said holographic devices collecting the zero order beam from the holograms of the first holographic device.

17. Projector according to claim 16, wherein the second assembly comprises a half wave plate and a pair of mirrors arranged on the zero order beam of the first holographic device, in order to rotate the plane of polarization of said zero order beam and to shift its axis in the direction of that of the second holographic device.

18. A projector of video images comprising:
   (a) a first assembly which comprises a matrix screen of liquid crystal cells attached to a grid of optical micro-lenses arranged for focusing at least two beams of polarized light with predetermined spectral compositions on at least two corresponding cells of the screen, and
   (b) a second assembly which comprises at least one holographic device according to claim 7 for illuminating the micro-lenses of the grid with at least two beams of light with said spectral compositions.

19. Projector according to claim 15, wherein the second assembly comprises first and second holographic devices, each of which illuminates a particular zone of the grid of micro-lenses, one of said holographic devices being illuminated directly by a light source and the other of said holographic devices collecting the zero order beam from the holograms of the first holographic device.

20. Projector according to claim 19, wherein the second assembly comprises a half wave plate and a pair of mirrors arranged on the zero order beam of the first holographic device, in order to rotate the plane of polarization of said zero order beam and to shift its axis in the direction of that of the second holographic device.

* * * * *